United States Patent
Yan et al.

(10) Patent No.: US 11,210,426 B2
(45) Date of Patent: Dec. 28, 2021

(54) TRACING OBJECTS ACROSS DIFFERENT PARTIES

(71) Applicant: MICROSOFT TECHNOLOGY LICENSING, LLC, Redmond, WA (US)

(72) Inventors: Ying Yan, Beijing (CN); Yang Chen, Beijing (CN); Thomas Moscibroda, Beijing (CN); Eric Chang, Beijing (CN); Jinglei Ren, Beijing (CN); Liang Chen, Beijing (CN); Yanjie Gao, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 409 days.

(21) Appl. No.: 16/331,868

(22) PCT Filed: Sep. 9, 2016

(86) PCT No.: PCT/CN2016/098610
§ 371 (c)(1),
(2) Date: Mar. 8, 2019

(87) PCT Pub. No.: WO2018/045574
PCT Pub. Date: Mar. 15, 2018

(65) Prior Publication Data
US 2021/0182433 A1    Jun. 17, 2021

(51) Int. Cl.
*H04L 29/06* (2006.01)
*G06F 21/64* (2013.01)
(Continued)

(52) U.S. Cl.
CPC .......... *G06F 21/645* (2013.01); *G06F 16/219* (2019.01); *G06F 16/2474* (2019.01);
(Continued)

(58) Field of Classification Search
CPC .. G06F 21/645; G06F 16/219; G06F 16/2474; G06F 21/604; H04L 9/3239; H04L 9/3247; H04L 2209/38
(Continued)

(56) References Cited

U.S. PATENT DOCUMENTS 7,003,470 B1    2/2006 Baker et al.
8,024,241 B2    9/2011 Bailey et al.
(Continued)

FOREIGN PATENT DOCUMENTS

CN    104735164 A    6/2015
CN    105573828 A    5/2016
(Continued)

OTHER PUBLICATIONS

"Office Action Issued in Russian Patent Application No. 2019106301", dated Mar. 24, 2020, 7 Pages (W/O English Translation).
(Continued)

*Primary Examiner* — Shin-Hon (Eric) Chen

(57) ABSTRACT

In implementations of the subject matter described herein, a new approach for controlling and tracing an object across a plurality of parties is proposed. A rule set may be enabled by the confirmation of a plurality of parties. The rule set may define constraints on operations related to the object. Upon receipt of a request for an operation related to the object, the requested operation may be verified based on the rule set agreed by the plurality of parties. In response to verifying that requested operation is valid, the requested operation may be performed, and a record for the operation may be created and stored in a blockchain database accessible to the plurality of parties.

20 Claims, 4 Drawing Sheets

(51) Int. Cl.
*G06F 16/21* (2019.01)
*G06F 16/2458* (2019.01)
*G06F 21/60* (2013.01)
*H04L 9/32* (2006.01)

(52) U.S. Cl.
CPC .......... *G06F 21/604* (2013.01); *H04L 9/3239* (2013.01); *H04L 9/3247* (2013.01); *H04L 2209/38* (2013.01)

(58) Field of Classification Search
USPC .......................................................... 713/178
See application file for complete search history.

(56) References Cited

U.S. PATENT DOCUMENTS

| | | | |
|---|---|---|---|
| 8,055,560 | B2 | 11/2011 | Gelerman |
| 8,533,022 | B2 | 9/2013 | Krishnan Nair |
| 8,766,981 | B2 | 7/2014 | McLachlan et al. |
| 9,298,806 | B1 | 3/2016 | Vessenes et al. |
| 9,300,678 | B1 | 3/2016 | Stack et al. |
| 2013/0246470 | A1 | 9/2013 | Price et al. |
| 2014/0114841 | A1 | 4/2014 | Kenkre et al. |
| 2014/0267293 | A1 | 9/2014 | Brodsky et al. |
| 2015/0067149 | A1 | 3/2015 | Hitomi et al. |
| 2016/0028552 | A1 | 1/2016 | Spanos et al. |
| 2016/0132889 | A1 | 5/2016 | Setlur |
| 2016/0217436 | A1 | 7/2016 | Brama |
| 2016/0259937 | A1* | 9/2016 | Ford ...................... G06F 21/577 |
| 2017/0005804 | A1* | 1/2017 | Zinder ................ G06F 21/6254 |
| 2017/0011460 | A1* | 1/2017 | Molinari ................ G06F 21/645 |
| 2017/0048216 | A1* | 2/2017 | Chow ...................... G06Q 40/08 |
| 2017/0140408 | A1* | 5/2017 | Wuehler ............ G06Q 30/0207 |
| 2017/0177898 | A1* | 6/2017 | Dillenberger ......... H04L 9/3236 |
| 2017/0301047 | A1* | 10/2017 | Brown .................. G06Q 20/382 |
| 2017/0344988 | A1* | 11/2017 | Cusden ................... G06F 21/00 |
| 2017/0345011 | A1* | 11/2017 | Salami .................... G06Q 20/10 |
| 2017/0352116 | A1* | 12/2017 | Pierce ..................... H04L 63/10 |
| 2018/0019867 | A1* | 1/2018 | Davis .................... H04L 9/3236 |
| 2018/0191502 | A1* | 7/2018 | Karame ................. G06Q 20/02 |
| 2019/0253431 | A1 | 8/2019 | Atanda |
| 2019/0268284 | A1* | 8/2019 | Karame ............... H04L 9/3236 |
| 2020/0374106 | A1* | 11/2020 | Padmanabhan ..... H04L 63/0428 |
| 2021/0211468 | A1* | 7/2021 | Griffin .................. H04L 9/0637 |

FOREIGN PATENT DOCUMENTS

| | | | |
|---|---|---|---|
| CN | 105893042 | A | 8/2016 |
| EP | 1646943 | A1 | 4/2006 |
| JP | 6636058 | B2 | 12/2019 |
| RU | 2130643 | C1 | 5/1999 |
| WO | 0055774 | A2 | 9/2000 |
| WO | 2016063092 | A1 | 4/2016 |

OTHER PUBLICATIONS

"Office Action Issued in Indonesian Patent Application No. P00201901922", dated Apr. 12, 2021, 4 Pages.

"Office Action and Search Report Issued in Chilean Patent Application No. 201900517", dated Jun. 1, 2021, 10 Pages.

"Office Action Issued in New Zealand Patent Application No. 750459", dated Jun. 3, 2021, 5 Pages.

"Office Action Issued in Colombian Patent Application No. NC2019/0001989", dated Apr. 20, 2020, 4 Pages. (W/o English Translation).

"Office Action and Search Report Issued in Chile Patent Application No. 201900517", dated May 13, 2020, 11 Pages.

"Office Action Issued in European Patent Application No. 16915508.2", dated Aug. 7, 2020, 5 Pages.

"Office Action Issued in Chile Patent Application No. 201900517", dated Jan. 9, 2020, 10 Pages.

Swan, Melanie, "Blockchain: Blueprint for a New Economy", Published By: O'Reilly Media, Inc., Feb. 2015, 149 Pages.

"Search Report Issued in European Patent Application No. 16915508.2", dated Jan. 27, 2020, 7 Pages.

"Office Action Issued in Israel Patent Application No. 264888", dated Nov. 2, 2020, 8 Pages.

"Office Action Issued in Japanese Patent Application No. 2019-513386", dated Oct. 19, 2020, 4 Pages.

"Office Action Issued in European Patent Application No. 16915508.2", dated Mar. 26, 2021, 5 Pages.

International Search Report and Written Opinion for PCT/CN2016/098610, dated Jun. 14, 2017.

"Office Action Issued in Brazilian Patent Application No. BR112019002548-0", dated Jul. 20, 2020, 5 Pages.

"Blockchain", Retrieved from https://en.wikipedia.org/wiki/Blockchain, Retrieved on Dec. 10, 2019, 8 Pages.

"Smart Contract", Retrieved from https://en.wikipedia.org/wiki/Smart_contract, Retrieved on Dec. 10, 2019, 4 Pages.

Greenspan, Gideon, "Four Genuine Blockchain Use Cases", Retrieved from https://www.multichain.com/blog/2016/05/four-genuine-blockchain-use-cases/, May 10, 2016, 9 Pages.

Meiklejohn, et al., "A Fistful of Bitcoins: Characterizing Payments Among Men with No Names", In Proceedings of the Conference on Internet Measurement Conference, vol. 38, No. 6, Dec. 1, 2013, 6 Pages.

Schatsky, et al., "Beyond Bitcoin: Blockchain is Coming to Disrupt your Industry", Retrieved from https://www2.deloitte.com/us/en/insights/focus/signals-for-strategists/trends-blockchain-bitcoin-security-transparency.html, Dec. 7, 2015, 15 Pages.

Wright, et al., "Decentralized Blockchain Technology and the Rise of Lex Cryptographia", In Technical Report of SSRN 2580664, Mar. 12, 2015, 58 Pages.

"First Office Action Issued in New Zealand Patent Application No. 750459", dated Mar. 31, 2021, 4 Pages.

"Office Action Issued in Australian Patent Application No. 2016422515", dated Jul. 29, 2021, 3 Pages.

"First Examination Report Issued in Indian Patent Application No. 201917008106", dated Aug. 9, 2021, 7 Pages.

"Office Action Issued in New Zealand Patent Application No. 750459", dated Aug. 11, 2021, 6 Pages.

Seibold, et al., "Consensus Immutable Agreement for the Internet of Value", Retrieved From: https://assets.kpmg/content/dam/kpmg/pdf/2016/07/kpmg-blockchain-consensus-mechanism.pdf, Jul. 2016, 15 Pages.

"Office Action Issued in Australian Patent Application No. 2016422515", dated Oct. 11, 2021, 6 Pages.

"Office Action Issued in New Zealand Patent Application No. 750459", dated Oct. 6, 2021, 3 Pages.

* cited by examiner

TRACING OBJECTS ACROSS DIFFERENT PARTIES

CROSS-REFERENCE TO RELATED APPLICATION

This application is a U.S. National Stage Application of PCT/CN2016/098610, filed Sep. 9, 2016, which application is hereby incorporated by reference. To the extent appropriate, a claim of priority is made to the above disclosed application.

BACKGROUND

Different parties, such as individuals, companies, organizations or other entities, usually have their own databases for recording of objects of interest, such as assets, documents, goods or the like, among parties. Each party keeps their own records and periodically checks with each other whether the records are consistent with each other. Because of different data format, schema and synchronization frequencies and even errors, it is demanding for all the parties to reach consensus in all cases. Another way to organize cross-organization activities involves choosing one party among the plurality of parties to keep all records, or finding an independent third party to store all records. However, in these centralized solutions, the party acting as the central management party is susceptible to be attacked. Thus, it is challenging to reliably control and trace the flow or distribution of the objects across the different parties.

SUMMARY

In accordance with implementations of the subject matter described herein, a new approach for controlling and tracing objects across different parties is proposed. In order to allow one or more of these parties to control and trace the flow of objects across these different parties, a rule set is enabled for the plurality of parties. The rule set defines a constraint(s) on one or more operations related to an object. Upon receipt of a request for an operation related to the object from a party, the requested operation can be verified based on the rule set. If the requested operation is valid, the operation will be performed, and a record for the operation will be created, which is specific to the rule set. The record is then stored in a blockchain database accessible to the plurality of parties. The blockchain database, which may be also referred to as blockchain ledger or blockchain distributed database, is a distributed database that maintains a continuously-growing list of data records secured from tampering and revision. In this way, distribution and flow of the object can be effectively and efficiently controlled and traced among different parties.

It is to be understood that the Summary is not intended to identify key or essential features of implementations of the subject matter described herein, nor is it intended to be used to limit the scope of the subject matter described herein. Other features of the subject matter described herein will become easily comprehensible through the description below.

BRIEF DESCRIPTION OF THE DRAWINGS

The details of one or more implementations of the subject matter described herein are set forth in the accompanying drawings and the description below. Other features, aspects, and advantages of the disclosure will become apparent from the description, the drawings, and the claims, wherein:

Throughout the figures, same or similar reference numbers will always indicate same or similar elements.

DETAILED DESCRIPTION

Principle of the subject matter described herein will now be described with reference to some example implementations. It is to be understood that these implementations are described only for illustration to help those skilled in the art to understand and implement the subject matter described herein, without suggesting any limitations as to the scope of the disclosure. The disclosure described herein can be implemented in various manners other than the ones describe below.

As used herein, the term "include" and its variants are to be read as open terms that mean "include, but is not limited to." The term "based on" is to be read as "based at least in part on." The term "a" is to be read as "one or more" unless otherwise specified. The term "one implementation" and "an implementation" are to be read as "at least one implementation." The term "another implementation" is to be read as "at least one other implementation."

Moreover, it is to be understood that in the context of the subject matter described herein, the terms "first," "second," "third" and the like are used to indicate individual elements or components, without suggesting any limitation as to the order of these elements. Further, unless otherwise indicated, a first element may or may not be the same as a second element. Other definitions, explicit and implicit, may be included below.

Conventionally, as mentioned above, a party such as an organization, company, individual, and the like may not be able to reliably control and trace how an object of the party is transferred among other parties after the object has been transferred to another party. As used herein, an object may refer to any digital information representing documents, goods, assets, or the like. In other words, after the object has left the boundary of the party, it may be out of control. For example, a donor to a charitable organization would like to control and trace the flow of his donations after the donations have been donated to the charitable organization. In this way, the donor would like to ensure that the donations are indeed being used as intended. As another example, a user who shares his photos on the social network would also like to control and trace the flow of the photos for privacy purpose. However, the traditional database management systems generally cannot allow a party to reliably and easily control and trace the flow of its object, since each party maintains and controls its own database system.

In order to at least in part solve the above and other potential problems, according to implementations of the subject matter described herein, a new approach for controlling and tracing objects across different parties is proposed.

Example System

Figure 1:
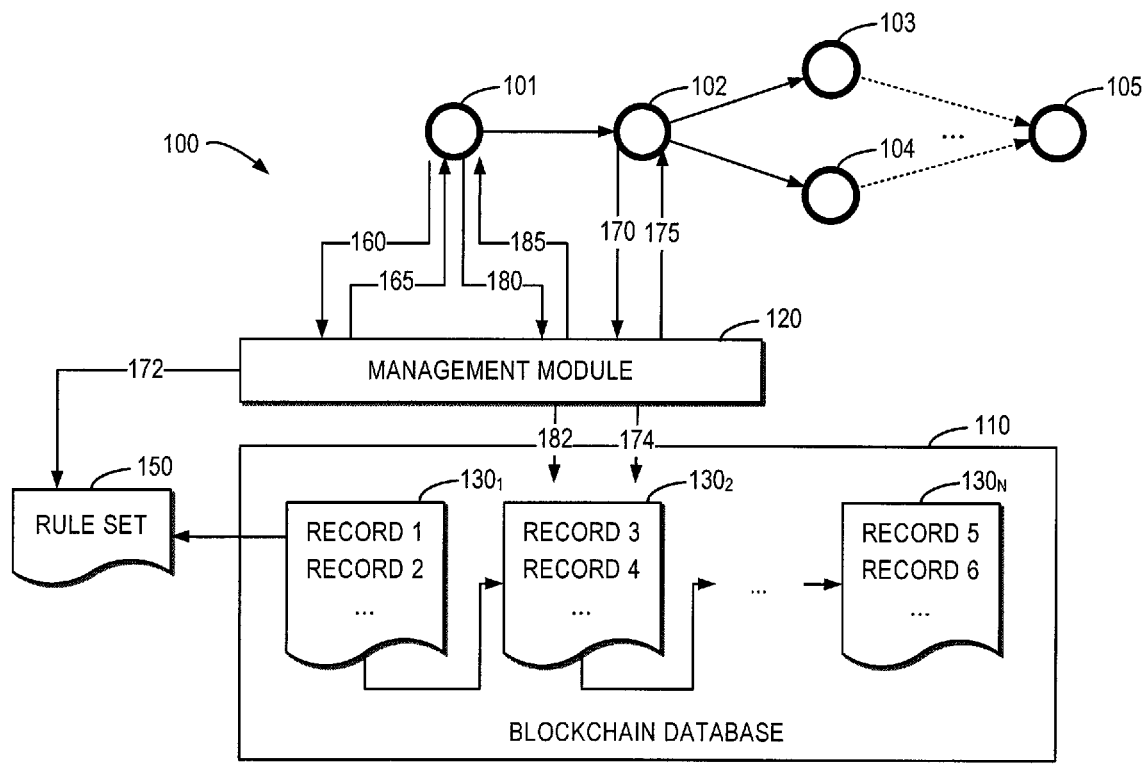
FIG. 1 is a schematic diagram illustrating a system in accordance with implementations of the subject matter described herein.

Reference is first made to FIG. 1 which shows a schematic diagram illustrating an environment 100 in which example implementations of the subject matter described herein can be implemented.

As shown, there are a plurality of parties 101 to 105 such as individuals, organizations, or any other entities. It is to be understood that although five parties 101-105 are shown, the system 100 may include any suitable number of parties. Each party may have a device such as a laptop computer, a desktop computer, a tablet computer, a server, a mobile device, a wearable device, or the like. The parties 101-105 may be communicatively connected to one another via a network. Examples of the network may include, but is not limited to, a wired or wireless network, such as a local area network ("LAN"), a metropolitan area network ("MAN") a wide area network ("WAN") or the Internet, a communication network, a near field communication connection or any combination thereof.

The environment 100 also includes a blockchain database 110 and a management module 120. The management module 120 is in communication with the parties 101 to 105 and controls the blockchain database 110. That is, the management module 120 can be considered as a database management system (DBMS). It is to be understood that although shown as separate components, the blockchain database 110 and the management module 120 can be integrated with one another. Specifically, in some implementations, the management module 120 may be a distributed module.

The blockchain database 110 is accessible to the parties 101 to 105. The blockchain database 110 may be a distributed database that maintains a list of data records secured from tampering and revision. The records are organized in data blocks, with each block holding batches of individual records. For example, as shown, the records 1-6 are stored in blocks $130_1$, $130_2$ and $130_N$. In some implementations, the blocks may be cryptographically connected one by one. The blocks may include a signature, and the signature of one block depends on the signatures and records of the preceding blocks. For example, the signature of one block may be computed from the hash value of the signatures and records of the preceding blocks. It would be appreciated through the following description that all operations of the object are immutable, controllable and traceable in this database management system.

As described above, one or more objects may be transferred, shared or may otherwise flow among the parties 101 to 105. Examples of an object include, but are not limited to, electronic documents, photos, videos, audios, assets, and the like. Each party may perform operations on the object such as transferring, sharing, consuming, deleting, or the like.

According to implementations of the subject matter described herein, a party may define a rule set 150 to describe one or more constraints concerning one or more operations related to an object of interest. For ease of discussion, in the following description, the terms "rule(s)" and "rule set" can be used interchangeably.

Generally speaking, the rule set 150 may be related to any aspects and/or attributes, concerning one or more operations of the object. Example rule set 150 will be further described in the following paragraphs. In some implementations, the rule set 150 may be initiated by the owner of the object, for example. Of course, any other relevant parties can propose the rule set 150 as well. For ease of discussion, in the following discussions, it is assumed that the party 101 initiates the rule set 150.

The rule set 150 may be implemented in any suitable formats. For example, in some implementations, the rule set 150 may include executable code written by any suitable programming language and/or script language. Alternatively, or in addition, the rule set 150 may be described in a formatted text such as Extensive Markup Language (XML) text or a plaintext. The rule set 150 may be stored in the blockchain database 110 by the management module 120 or in any other suitable storage.

After receiving (160) the request for setting the rule set 150 from the party 101, the management module 120 broadcasts the rule set 150 to the parties 102 to 105. If a party accepts the rule set 150, the party may send a confirmation message back to the management module 120. In some implementations, if a predetermined number of parties in the system confirm the rule set 150, then the rule set 150 is enabled. In some implementations, the management module 120 may send (165) to the party 101, directly or upon inquiry, a notification as to whether the proposed rule set 150 has been accepted by the other parties and thus enabled. An example process in this aspect will be described below with reference to FIG. 2.

Then a party may send a request for initiating an operation of the object. For instance, in the example shown in FIG. 1, the management module 120 receives (170) from the party 102 a request for transferring the object to the party 104. The management module 120 verifies (172) the requested operation based on the rule set 150 that has been stored in advance.

If the requested operation is determined valid, the management module 120 causes the operation to be performed. In this event, the management module 120 creates a record for the operation and stores (174) the record into the blockchain 110. This record, among other things, may include an event identification (ID) which is specific to the rule set 150. That is, all the operations or actions performed by the parties 101 to 105 on the object under the rule set 150 belong to the same event, and all the operations or actions belonging to this event may be recorded in the blockchain with the same event ID.

The distributed blockchain database 110 includes a plurality of storages. The records stored in one storage device will be synchronized with the other storages. For example, the storage will check whether the records stored in it are the same as the records stored in a predetermined number of neighboring storages. If the records are not the same, this storage will revise the records stored in it according to the records stored in the neighboring storages. In this way, the flow of the object is traceable and immutable, which will be discussed below.

In some implementations, instances of the management module 120 may be implemented on distributed blockchain database 110, such that the parties may interact with any instance or all the instances of the management module 120. Alternatively, instances of the management module 120 may be implemented on the parties, such that individual parties may interact with respective instances of the management module 120. Accordingly, the records stored in the plurality of storages of the blockchain database 110 will be synchronized, so that the flow of the object can be controlled and traced.

In some implementations, different parties may set the same constraint(s) on one or more operations related to its object. In that case, for example, a globally controlled and randomly generated number can be taken into account in generating a respective event ID to differentiate different parties.

On the other hand, if the requested operation is invalid, the management module 120 may deny the request. For example, the management module 120 may send (175), directly or upon inquiry, a notification to the node 102 to notify whether the operation has been performed. An example implementation will be described with reference to FIG. 3 and example implementation in digital content distribution will be discussed in the following paragraphs.

When a party such as the party 101 wants to trace the flow of the object across the different parties, it may send a tracing request. Once receiving (180) the request, the management module 120 retrieves (182) one or more records for the operations related to the object from the blockchain database 110. In some implementations, the tracing request may include an event ID, and the records for the operations related to the object may be retrieved based on the event ID. Then the management module 120 returns (185) the retrieved records to the party 101. As such, the party 101 can be notified of the flow or distribution of the object in the event. If any violation is found by checking the records, the party 101 may react accordingly. An example implementation will be described with reference to FIG. 5.

Example Processes

Figure 2:
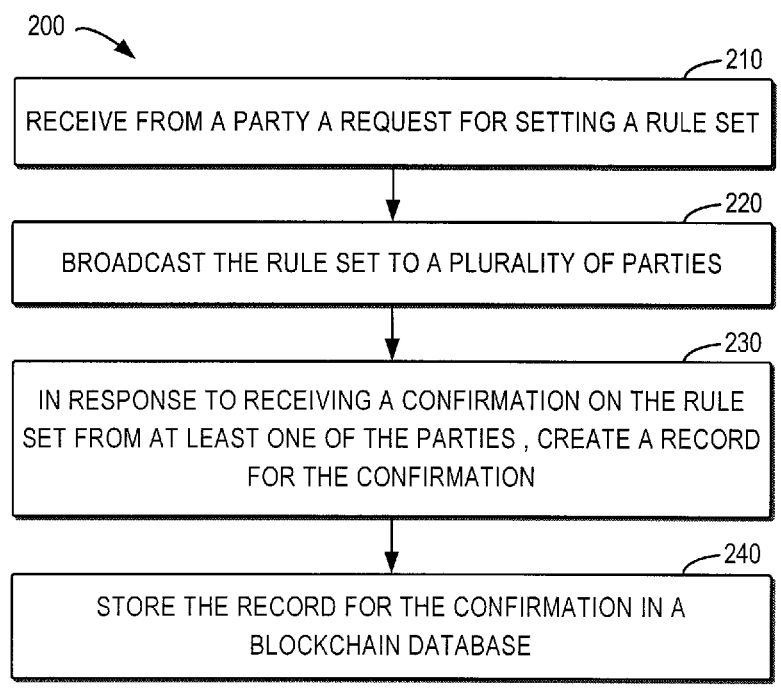
FIG. 2 is a flowchart illustrating a method for setting a rule set in accordance with an example implementation of the subject matter described herein.

Now some example implementations of the above processes will be discussed in detail. FIG. 2 is a flowchart illustrating a method 200 for setting the rule set 150 in accordance with an example implementation of the subject matter described herein. At 210, the management module 120 receives, from the party 101, a request for setting a rule set 150. The rule set 150 may be stored in advance, for example, in the blockchain 110.

As mentioned above, the rule set 150 may be related to any aspects and/or attributes, concerning operations of the object. For example, the rule set 150 may specify the maximum number of times that a party can transfer the object or the target to which the object can be transferred or shared. As another example, the rule set 150 may specify the conditions under which a party is allowed to consume the object. Alternatively, or in addition, the rule set 150 may specify respective levels of permission to different parties to control the tracing of the object. For example, the rule set 150 may prevent the party 102 from tracing the object of the party 101. In yet another implementation, the rule set 150 may specify a timer for setting a time limit in relation to one or more operations of the object.

For example, it is assumed that the party 101 transfers the object to the party 102 and that the rule set 150 specifies a timer for setting a time limit in relation to the object. For example, in the case that an object is transferred or provided to a party, the timer may specify a time period within which the receiving party is allowed to use or consume the object. If the receiving party does not consume the object within this time period, the object can be withdrawn or removed. In this case, the object is first transferred to the party 102, and a record for the transfer is created and stored. If the management module 120 detects that the party 102 does not transfer the object to the party 104 within a predetermined time set by the rule set 150, the management module 120 will trigger an operation to return the object back to the party 101.

At 220, the management module 120 broadcasts the rule set 150 to the plurality of parties, so that the other parties 102 to 105 may each make a determination as to whether to accept the rule set 150 proposed by the party 101.

At 230, if confirmations on the rule set 150 are received from at least one of the parties 102 to 105, the management module 120 may enable the rule set 150. Moreover, a record may be created and stored for each of the received confirmations. For example, it is assumed that the parties 102, 103 and 105 send their confirmations to the management module 120. The confirmations may include a signature of the parties 102, 103 and 105, respectively. For each confirmation, the management module 120 creates a record including, for example, at least one of the following: an event ID specific to the rule set 150, a description for the confirmation, and a timestamp indicating a time point when the confirmation is sent.

In some implementations, the confirmation record may also include a reference to the rule set 150. The reference may be implemented as a pointer or a uniform resource indicator (URI). Alternatively, or in addition, the confirmation may include a signature of the respective party and a public key for decrypting the signature. The signature can be computed, for example, by encrypting the event ID, the public key and/or the reference to the rule set 150 using a private key.

As described above, the original party, such as the party 101, can initiate the rule set 150 concerning its object, and thus can control how the object is transferred among other parties after the object has been transferred to another party. For example, a user who shares his/her photos on the social network can initiate the rule set 150 specifying that the object can only be transferred to certain specified networks. Otherwise, the sharing operation will be denied. In this way, the distribution of the photos can be controlled.

Figure 3:
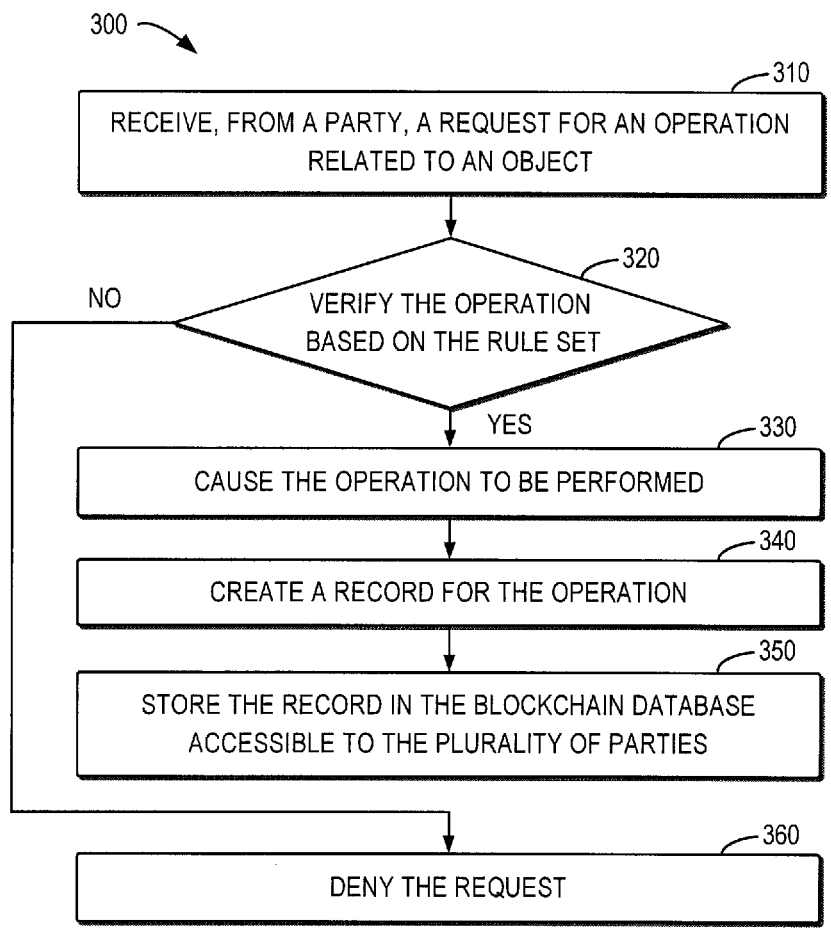
FIG. 3 is a flowchart illustrating a method for performing the operation related an object in accordance with an example implementation of the subject matter described herein.

FIG. 3 is a flowchart illustrating a method 300 for performing an operation on the object in accordance with an example implementation of the subject matter described herein. At 310, the management module 120 receives a request for an operation related to an object from a party such as the party 102. For example, the requested operation is to transfer or share at least a part of the object to another party such as the party 104.

The request may include description or ID of the requested operation, and the object. In addition, in some implementations, the request may further include at least one of the following: an event ID which is specific to the rule set 150 agreed by the parties 101 to 105, a reference to the rule set 150, a signature of the party, a public key for decrypting the signature of the initiating party (in this example, the party 102), and a timestamp indicating a time point when the request is sent. In some implementations, the ID for the operation can be computed as a hash value of the event ID, the description of the operation, the public key and the reference to the rule set 150.

Figure 4:
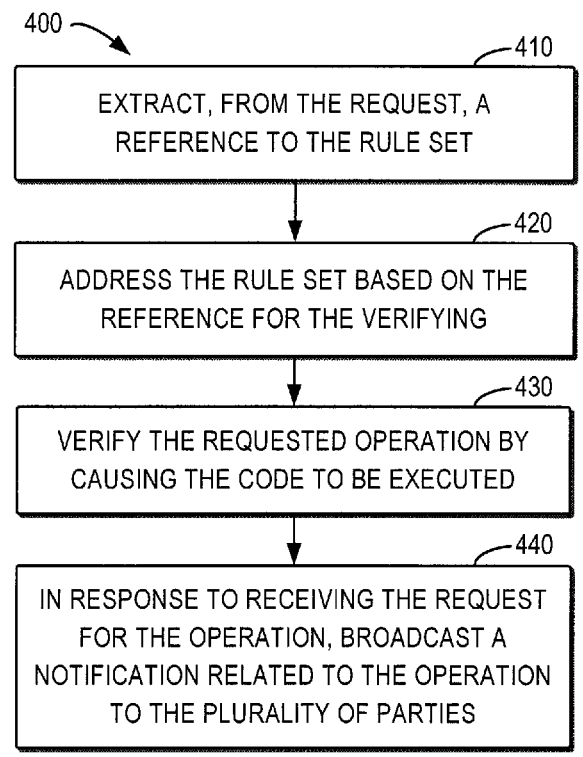
FIG. 4 is a flowchart illustrating a method for verifying the operation related to the object in accordance with an example implementation of the subject matter described herein.

At 320, the management module 120 verifies the requested operation based on the rule set 150 agreed by the plurality of parties. An example implementation in this regard is shown in FIG. 4. The management module 120 will first check the blockchain database 110 to determine whether the record for the confirmation exists, the record comprises the signature of the party 102. Then, at 410, the management module 120 may extract a reference to the rule set 150 from the request. At 420, the management module 120 addresses and retrieves the rule set 150 based on the reference. At 430, the management module 120 verifies the requested operation by checking whether description of the requested operation conforms to the rule set 150. For example, in the case that the rule set 150 contains executable code, the management module 120 may cause the code to be executed to check whether there is any violation.

Optionally, in some implementations, at 440, the management module 120 may broadcast a notification related to the operation to the plurality of parties. For example, the management module 120 may broadcast a notification to all the parties 101 to 105 agreed with the rule set 150 to notify that the operation is being verified or performed. Alternatively, the management module 120 may only send the notification to certain one or more parties as specified in the rule set 150.

Still in reference with FIG. 3, if the requested operation is determined valid at 320, the management module 120 causes the operation to be performed at 330 and creates a record for the operation at 340. The record at least includes the event ID that is specific to the used rule set 150. In addition, in some implementations, the operation record may further include one or more of the following: a reference to the rule set 150, an ID for the operation, a description of the operation, a signature of the related party, a public key for decrypting the signature, and a timestamp indicating a time point when the request is sent. In some implementations, some or all of the information to be included in the record may be obtained from the operation request, for example.

Then, at 350, the created record is stored in the blockchain database 110. In this way, all the operations of the object will be recorded with a unique event ID. Later a party may trace the flow of that object by searching the blockchain 110 for the records with the respective event ID, as will be discussed below.

On the other hand, if it is determined at 320 that the rule set 150 is violated, the management module 120 may deny the request at 360. In this event, no record for the operation will be created. Alternatively, in other implementations, the management module 120 may still create and store a record for the operation and assign this record with an indicator that the operation has been rejected.

Because the party, such as the party 102, receiving the object from the original party, such as the party 101, can only perform operations being validated based on the rule set 150, the original party can control how the object is transferred among other parties after the object has been transferred to another party. For example, in a social network a shared photo can subsequently only be shared with other users specified by the original owner of the photo. As another example, a donor to a charity organization can specify that her donation may only be used by certain purpose.

Figure 5:
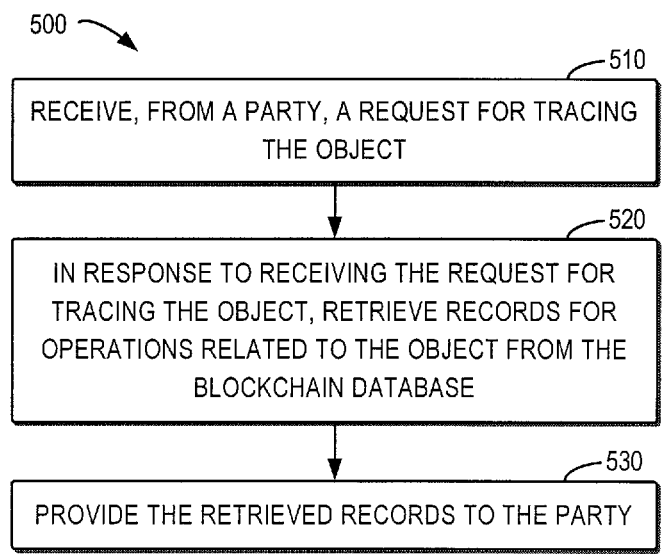
FIG. 5 is a flowchart illustrating a method for tracing the object in accordance with an example implementation of the subject matter described herein.

FIG. 5 is a flowchart illustrating a method 500 for tracing the object in accordance with an example implementation of the subject matter described herein. At 510, the management module 120 receives, from any party among the plurality of parties 101 to 105, a request for tracing the object. In response, at 520, the management module 120 retrieves one or more records for operations related to the object from the blockchain database 110. At 530, the management module 120 provides the retrieved records to the inquiring party. As described above, the operations of the object verified based on the rule set 150 may share the same event ID. That is, the records for the operations belonging to the same event can be retrieved by the event ID. Based on these records, the inquiring party may know that, for example, the object is first transferred from the party 101 to the party 102, and then transferred from the party 102 to the party 104, and so on. In some implementations, the retrieved operations may be visualized to clearly present the flow or distribution of the object. Accordingly, a party can reliably and easily trace the flow of its object. An example of visualization will be described with reference to FIG. 8.

Figure 6:
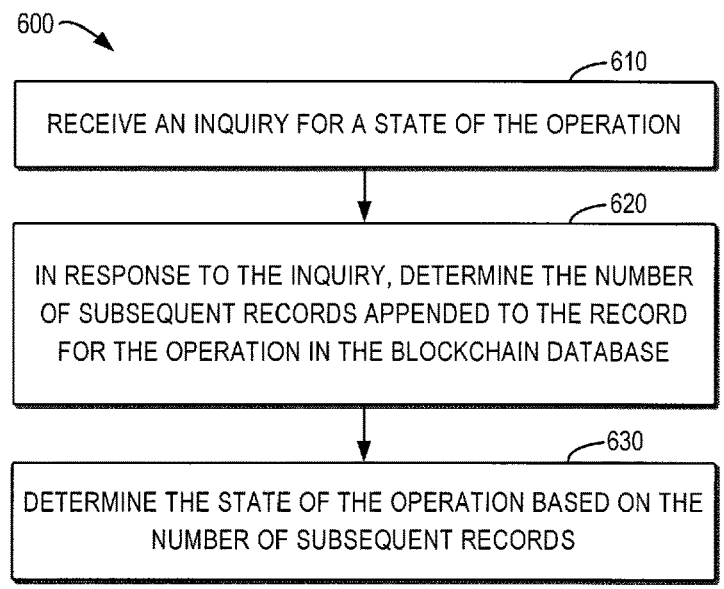
FIG. 6 is a flowchart illustrating a method for inquiring for a state of the operation in accordance with an example implementation of the subject matter described herein.

FIG. 6 is a flowchart illustrating a method 600 for inquiring for a state of the operation in accordance with an example implementation of the subject matter described herein. At 610, the management module 120 receives an inquiry for a state of an operation. As used herein, the term "state" indicates whether the operation has been successfully performed.

At 620, in response to the inquiry, the management module 120 may determine the number of subsequent records that have been appended to the record for the target operation in the blockchain database 110.

At 630, the management module 120 determines the state of the operation based on the number of subsequent records. It can be known from the mechanism of the blockchain database 110 that if the number of subsequent appended records exceeds a predetermined number, it means that the record for the operation has been accepted by a sufficiently large number of parties involved in the system. In this case, the operation can be considered successful. Otherwise, a relatively small number of appended records would probably indicate that the operation record is not recognized by the other parties, for example, due to communication delay and/or other factors. As a result, the number of subsequent records can be used to determine the state of the operation. In some implementations, the management module 120 may determine the state of operation by itself. Alternatively, the management module 120 may return the blocks of subsequent records appended to the record to the inquiring party 102, so that the party 102 may determine the state of the operation based on the number of subsequent records.

As a result, the inquiring party can obtain the current state of the operation, and determine whether to take further operations based on the state. For example, if the party 102 found that its requested operation is denied, the party 102 can send another request for the operation again.

Figure 7:
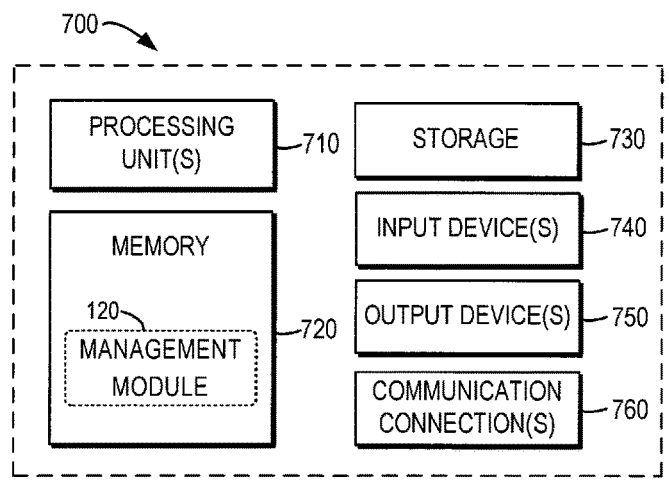
FIG. 7 is a block diagram of a device suitable for implementing one or more implementations of the subject matter described herein.

FIG. 7 is a block diagram of a device 700 suitable for implementing one or more implementations of the subject matter described herein. For example, the device 700 may function as the management module 120 as discussed above with reference to FIG. 2. It is to be understood that the device 700 is not intended to suggest any limitation as to scope of use or functionality of the subject matter described herein, as various implementations may be implemented in diverse general-purpose or special-purpose computing environments.

As shown, the device 700 includes at least one processing unit (or processor) 710 and a memory 720. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory), or some combination thereof.

In the example shown in FIG. 7, the device 700 further includes storage 730, one or more input devices 740, one or more output devices 750, and one or more communication connections 760. An interconnection mechanism (not shown) such as a bus, controller, or network interconnects the components of the device 700. Typically, operating system software (not shown) provides an operating environment for other software executing in the device 700, and coordinates activities of the components of the device 700.

The storage 730 may be removable or non-removable, and may include computer-readable storage media such as flash drives, magnetic disks or any other medium which can be used to store information and which can be accessed within the device 700. The input device(s) 740 may be one or more of various different input devices. For example, the input device(s) 740 may include a user device such as a mouse, keyboard, trackball, etc. The input device(s) 740 may implement one or more natural user interface techniques, such as speech recognition or touch and stylus recognition. As other examples, the input device(s) 740 may include a scanning device; a network adapter; or another device that provides input to the device 700. The output device(s) 750 may be a display, printer, speaker, network adapter, or another device that provides output from the device 700. The input device(s) 740 and output device(s) 750 may be incorporated in a single system or device, such as a touch screen or a virtual reality system.

The communication connection(s) 760 enables communication over a communication medium to another computing entity. Additionally, functionality of the components of the device 700 may be implemented in a single computing machine or in multiple computing machines that are able to communicate over communication connections. Thus, the device 700 may operate in a networked environment (for example, the environment 100) using logical connections to one or more other servers, network PCs, or another common network node. By way of example, and not limitation, communication media include wired or wireless networking techniques.

In accordance with implementations of the subject matter described herein, a management module 120 may be executed on the device 700 to control and trace operations related to an event regarding an object. When executed by the processing unit 760, at least a portion of the management module 120 will be loaded into the memory 720. The other portion (if any) of the management module 120 may be stored in the storage 730 or any other non-volatile storage medium. In operation, the management module 120 may carry out one or more methods/processes as described above.

Example Scenarios

Now example implementations of the subject matter described herein will be described in the context of digital copyright management (CRM). For example, a party (for example, a publisher) would like to easily and reliably control and trace the flow of its digital content and ensure that the digital content is being used by an intended party (for example, a viewer) within a specified time limit or for a specified number of times. Examples of the digital content include, but are not limited to, videos, audios, images, reviews, or any other suitable digital content.

To this end, the publisher may prescribe a rule set 150 for the digital content and store the rule set 150 in the blockchain 110 via the management module 120. For example, the rule set 150 may specify that any viewer who receives the digital content from the publisher may only consume the digital content within 15 days. The digital content may be accessed or consumed by the viewer only within this period. The rule set 150 may also specify that the viewer may share the digital content to the other viewers no more than 10 times.

In one implementation, setting and verifying the rule set 150 may be implemented as executable code. An example code snippet is shown as follows:

```
content AutoDelete{ // delete the digital content for 15 days
Unit_64 public start_time;
Unit public digital_content;
Int public lifetime;
function AutoDelete{ // constructor, called when the rule set 150 is created
    lifetime = 15 day;
    digital_content = 0;
    start_time = 0;
    transfer_times = 10;
}
function( ) { // main code, called per invocation
    if (msg.sender.type == 'delete' && digital_content && now - start_time> lifetime){ // periodical system delete testing transaction
        unit object = digital_content;
        digital_content = 0;
        delete (object);
    }
    else if (msg.sender.type == 'digital_content') { // digital content transferring
        start_time = now;
        digital_content = msg.sender.object;
    }
    else if (msg.sender.type == 'viewer' && digital_content &&msg.sender.value <= transfer_times){ // processing the digital content
        transfer_times −= msg.sender.value;
}
```

The publisher sends a request for setting the code to the management module 120. The management module 120 broadcasts the code for other parties' confirmations. Then the publisher may send a request for transferring the digital content to a first viewer. The management module 120 will check the blockchain database 110 to determine whether the first viewer accepts the rule set 150. If so, the management module 120 extracts a reference to code from the request, accesses the code and causes the code to be executed to check whether there is any violation.

Upon a determination that the requested operation is valid, the management module 120 permits the digital content to be distributed to the first viewer. A record for this distribution operation is created and stored into the blockchain 110. This record is specific to the rule set 150. As described above, all the operations or actions performed by the publisher and the first viewer on the digital content under the rule set 150 belong to the same event. As a result, their records in the blockchain 120 will have the same event ID.

Assume that the first viewer wants to share the digital content with a second viewer. Upon receipt of such a request, the management module 120 verifies the requested operation based on the rule set 150. More specifically, in this example, by executing the code the management module 120 can check the number of times that the first viewer has already shared the digital content to other viewers. If the number is equal to ten (10), the management module 120 will deny the request for sharing the digital content.

Additionally, as prescribed by the rule set 150, any viewer can only consume the digital content within 15 days. Therefore, once the digital content is distributed to the first viewer, the management module 120 may set a timer to monitor the length of time the first viewer possesses the digital content.

Once 15 days have passed, the management module 120 triggers an operation to remove the digital content from the first viewer.

Figure 8:
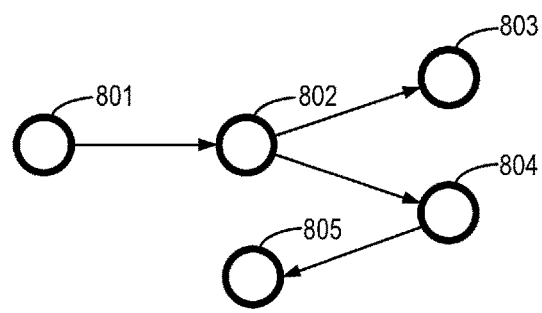
FIG. 8 is a schematic diagram illustrating an example visualization of the object tracing in accordance with an example implementation of the subject matter described herein.

Furthermore, the publisher and/or the viewer can check the states of the operations they initiated. For example, if the publisher wants to trace the flow of the digital content across the different parties, it may send a tracing request including the event ID. In response, the management module 120 retrieves one or more records including that event ID from the blockchain database 110 and returns the retrieved records to the publisher. In some implementations, these records can be visualized to present a flow of the digital content. For instance, FIG. 8 shows a schematic diagram of user interface (UI) 800 which shows the flow the digital content.

In the shown state of the UI 800, the publisher 810 can clearly see a distribution path of the digital content where the digital content is first transferred to the first viewer 802. The party 802 in turn shares the digital content to the viewer 803 and 804, and the viewer 804 further shares the content yet a further viewer 805. It is to be understood that the UI 800 is only an example without suggesting any limitations as to the scope of the subject matter described herein. UIs of any other suitable forms can be used to present the flow of digital content to end users.

In this way, if the publisher finds that the digital content is illegally distributed to some party (for example, a competitor), the publisher can take actions to protect its copyright. As such, the publisher can effectively and efficiently control and trace the flow of its digital content.

For the purpose of illustrating spirit and principle of the subject matter described herein, some specific implementations thereof have been described above. By setting the rule set defining one or more constraints on one or more operations related to the object, and tracing the object based on the event ID, one party may be allowed to control and trace the flow or distribution of an object it originally owned across other parties in a simple, reliable and trustable manner.

In general, the various example implementations may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example implementations of the subject matter described herein are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

In the context of the subject matter described herein, a machine readable medium may be any tangible medium that can contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the subject matter described herein may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions or operations specified in the flowcharts and/or block diagrams to be implemented. The program code may execute entirely on a computer, partly on the computer, as a stand-alone software package, partly on the computer and partly on a remote computer or entirely on the remote computer or server.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any disclosure or of what may be claimed, but rather as descriptions of features that may be specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable sub-combination.

Now only for the purpose of illustration, some example implementations will be listed below.

In some implementations, the subject matter described herein may be embodied as a method. The method comprises receiving, from a first party among a plurality of parties, a request for an operation related to an object; verifying the requested operation based on a rule set agreed by the plurality of parties, the rule set defining one or more constraints on one or more operations related to the object; and in response to verifying that requested operation is valid, causing the operation to be performed; creating a record for the operation, the record being specific to the rule set; and storing the record in a blockchain database that is accessible to the plurality of parties.

In some implementations, the method further comprises setting the rule set for the plurality of parties by: receiving, from a second party among the plurality of parties, a request for setting the rule set; broadcasting the rule set to the plurality of parties; and in response to receiving confirmations on the rule set from at least one of the plurality of parties, enabling the rule set.

In some implementations, the enabling the rule set comprises: in response to receiving a confirmation on the rule set from a third party among the plurality of parties, creating a record for the confirmation, the record including a signature of the third party; and storing the record for the confirmation in the blockchain database.

In some implementations, the method further comprises: receiving, from a fourth party among the plurality of parties, a request for tracing the object; in response to receiving the request for tracing the object, retrieving one or more records for operations related to the object from the blockchain database; and providing the retrieved records to the fourth party.

In some implementations, the verifying the requested operation further comprises: in response to receiving the request for the operation, broadcasting a notification related to the operation to the plurality of parties.

In some implementations, the verifying the requested operation comprises: extracting, from the request, a reference to the rule set; and addressing the rule set based on the reference for the verifying.

In some implementations, the rule set includes executable code, and wherein the verifying the requested operation comprises: verifying the requested operation by causing the code to be executed.

In some implementations, the first record further includes at least one of the following: an event identification (ID) specific to the rule set, a reference to the rule set, an ID for the operation, a description of the operation, a signature of the first party, a public key for decrypting the signature of the first party, and a timestamp indicating a time point when the first request is sent.

In some implementations, the method further comprises: receiving an inquiry for a state of the operation, the state indicating whether the operation is performed successfully; in response to the inquiry, determining the number of subsequent records appended to the record for the operation in the blockchain database; and determining the state of the operation based on the number of subsequent records.

In some implementations, the subject matter described herein may be embodied as a device. The device comprises a processing unit and a memory. The memory is coupled to the processing unit and stores instructions for execution by the processing unit. The instructions, when executed by the processing unit, cause the device to receive, from a first party among a plurality of parties, a request for an operation related to an object; verify the requested operation based on a rule set agreed by the plurality of parties, the rule set defining one or more constraints on one or more operations related to the object; and in response to verifying that requested operation is valid, cause the operation to be performed, create a record for the operation, the record being specific to the rule set, and store the record in a blockchain database that is accessible to the plurality of parties.

In some implementations, the instructions, when executed by the processing unit, further cause the device to set the rule set for the plurality of parties by: receiving, from a second party among the plurality of parties, a request for setting the rule set; broadcasting the rule set to the plurality of parties; and in response to receiving confirmations on rule set from at least some of the plurality of parties, enabling the rule set.

In some implementations, the enabling the rule set comprises: in response to receiving a confirmation on the rule set from a third party among the plurality of parties, creating a record for the confirmation, the record including a signature of the third party; and storing the record for the confirmation in the blockchain database.

In some implementations, the instructions, when executed by the processing unit, further cause the device to: receive, from a fourth party among the plurality of parties, a request for tracing the object; in response to receiving the request for tracing the object, retrieve one or more records for operations related to the object from the blockchain database; and providing the retrieved records to the fourth party.

In some implementations, the verifying the requested operation further comprises: in response to receiving the request for the operation, broadcasting a notification related to the operation to the plurality of parties.

In some implementations, the verifying the requested operation comprises: extracting, from the request, a reference to the rule set; and addressing the rule set based on the reference for the verifying.

In some implementations, the rule set includes executable code, and the verifying the requested operation comprises: verifying the requested operation by causing the code to be executed.

In some implementations, the record further includes at least one of the following: an event ID specific to the rule set, a reference to the rule set, an ID for the operation, a description of the operation, a signature of the first party, a public key for decrypting the signature of the first party, and a timestamp indicating a time point when the request is sent.

In some implementations, the instructions, when executed by the processing unit, further cause the device to: receive an inquiry for a state of the operation, the state indicating whether the operation is performed successfully; in response to the inquiry, determine the number of subsequent records appended to the record for the operation in the blockchain database; and determine the state of the operation based on the number of subsequent records.

In some implementations, the subject matter described herein may be embodied as a computer program product. The computer program product is tangibly stored on a non-transient machine-readable medium and comprises machine-executable instructions. The instructions, when executed on a device, causing the device to: receive, from a first party among a plurality of parties, a request for an operation related to an object; verify the requested operation based on a rule set agreed by the plurality of parties, the rule set defining constraints one or more on one or more operations related to the object; and in response to verifying that requested operation is valid, cause the operation to be performed, create a record for the operation, the record being specific to the rule set, and store the record in a blockchain database that is accessible to the plurality of parties.

In some implementations, the instructions, when executed on a device, further cause the device to set the rule set for the plurality of parties by: receiving, from a second party among the plurality of parties, a request for setting the rule set; broadcasting the rule set to the plurality of parties; and in response to receiving confirmations on the rule set from at least some of the plurality of parties, enabling the rule set.

In some implementations, the enabling the rule set comprises: in response to receiving a confirmation on the rule set from a third party among the plurality of parties, creating a record for the confirmation, the record including a signature of the third party; and storing the record for the confirmation in the blockchain database.

In some implementations, the instructions, when executed on a device, further cause the device to: receive, from a fourth party among the plurality of parties, a request for tracing the object; in response to receiving the request for tracing the object, retrieve one or more records for operations related to the object from the blockchain database; and providing the retrieved records to the fourth party.

In some implementations, the verifying the requested operation further comprises: in response to receiving the request for the operation, broadcasting a notification related to the operation to the plurality of parties.

In some implementations, the verifying the requested operation comprises: extracting, from the request, a reference to the rule set; and addressing the rule set based on the reference for the verifying.

In some implementations, the rule set includes executable code, and the verifying the requested operation comprises: verifying the requested operation by causing the code to be executed.

In some implementations, the record further includes at least one of the following: an event ID specific to the rule set, a reference to the rule set, an ID for the operation, a description of the operation, a signature of the first party, a public key for decrypting the signature of the first party, and a timestamp indicating a time point when the request is sent.

In some implementations, the instructions, when executed on a device, further cause the device to: receive an inquiry for a state of the operation, the state indicating whether the operation is performed successfully; in response to the inquiry, determine the number of subsequent records appended to the record for the operation in the blockchain database; and determine the state of the operation based on the number of subsequent records.

Various modifications, adaptations to the foregoing example implementations of this disclosure may become apparent to those skilled in the relevant arts in view of the foregoing description, when read in conjunction with the accompanying drawings. Any and all modifications will still fall within the scope of the non-limiting and example implementations of this disclosure. Furthermore, other implementations of the disclosures set forth herein will come to mind to one skilled in the art to which these implementations of the disclosure pertain having the benefit of the teachings presented in the foregoing descriptions and the drawings.

Therefore, it will be appreciated that the implementations of the disclosure are not to be limited to the specific implementations disclosed and that modifications and other implementations are intended to be included within the scope of the appended claims. Although specific terms are used herein, they are used in a generic and descriptive sense only and not for purposes of limitation.

What is claimed is:

1. A method comprising:
   receiving, from a first party among a plurality of parties, a request for an operation related to an object;
   verifying the requested operation based on a rule set agreed by the plurality of parties, the verifying comprising broadcasting a notification related to the operation to the plurality of parties, the rule set defining one or more constraints on one or more operations related to the object, the rule set being set by:
      receiving, from at least one of the plurality of parties, a request for setting the rule set; P2 broadcasting the rule set to the plurality of parties; and
      in response to receiving confirmation of the rule set from one or more of the plurality of parties, enabling the rule set by creating a record for the confirmation and storing the record in a blockchain database; and
   in response to verifying that requested operation is valid:
      causing the operation to be performed;
      creating a record for the operation, the record being specific to the rule set; and
      storing the record in the blockchain database, wherein the stored record enables the object to be traced.

2. The method of claim 1, further comprising:
   receiving, from a party among the plurality of parties, a request for tracing the object;
   in response to receiving the request for tracing the object, retrieving one or more records for operations related to the object from the blockchain data base; and
   providing the retrieved records to the party.

3. The method of claim 1, wherein the verifying the requested operation further comprises:
   extracting, from the request, a reference to the rule set; and
   addressing the rule set based on the reference for the verifying.

4. The method of claim 1, wherein the rule set includes executable code, and wherein the verifying the requested operation further comprises:
   verifying the requested operation by causing the code to be executed.

5. The method of claim 1, wherein the record further includes at least one of the following:
   an event identification (ID) specific to the rule set,
   a reference to the rule set,
   an ID for the operation,
   a description of the operation,
   a signature of the first party,
   a public key for decrypting the signature of the first party, and
   a timestamp indicating a time point when the request is sent.

6. The method of claim 1, further comprising:
   receiving an inquiry fora state of the operation, the state indicating whether the operation is performed successfully;
   m response to the inquiry, determining the number of subsequent records appended to the record for the operation in the blockchain database; and
   determining the state of the operation based on the number of subsequent records.

7. A device comprising:
   a processing unit; and
   a memory coupled to the processing unit and storing instructions for execution by the processing unit, the instructions, when executed by the processing unit, causing the device to perform acts comprising:
      receiving, from a first party among a plurality of parties, a request for an operation related to an object;
      verifying the requested operation based on a rule set agreed by the plurality of parties, the verifying comprising broadcasting a notification related to the operation to the plurality of parties, the rule set defining one or more constraints on one or more operations related to the object, the rule set being set by:
         receiving, from at least one of the plurality of parties, a request for setting the rule set;
         broadcasting the rule set to the plurality of parties; and
         in response to receiving confirmation of the rule set from one or more of the plurality of parties, enabling the rule set by creating a record for the confirmation and storing the record in a blockchain database; and
      in response to verifying that requested operation is valid:
         causing the operation to be performed;
         creating a record for the operation, the record being specific to the rule set; and
         storing the record in the blockchain database, wherein the stored record enables the object to be traced.

8. The device of claim 7, the acts further comprising:
receiving, from a party among the plurality of parties, a request for tracing the object;
in response to receiving the request for tracing the object, retrieving one or more records for operations related to the object from the blockchain data base; and
providing the retrieved records to the party.

9. The device of claim 7, wherein the verifying the requested operation further comprises:
extracting, from the request, a reference to the rule set; and
addressing the rule set based on the reference for the verifying.

10. The device of claim 7, wherein the rule set includes executable code, and wherein the verifying the requested operation further comprises:
verifying the requested operation by causing the code to be executed.

11. The device of claim 7, wherein the record further includes at least one of the following:
an event ID specific to the rule set,
a reference to the rule set,
an ID for the operation,
a description of the operation,
a signature of the first party,
a public key for decrypting the signature of the first party, and
a timestamp indicating a time point when the request is sent.

12. The device of claim 7, the acts further comprising:
receiving an inquiry fora state of the operation, the state indicating whether the operation is performed successfully;
in response to the inquiry, determining the number of subsequent records appended to the record for the operation in the blockchain database; and
determining the state of the operation based on the number of subsequent records.

13. A computer program product being tangibly stored on a non-transient machine-readable medium and comprising machine-executable instructions, the instructions, when executed on a device, causing the device to:
receive, from a first party among a plurality of parties, a request for an operation related to an object;
verify the requested operation based on a rule set agreed by the plurality of parties, the verifying comprising broadcasting a notification related to the operation to the plurality of parties, the rule set defining one or more constraints on one or more operations related to the object, the rule set being set by:
receive, from at least one of the plurality of parties, a request for setting the rule set;
broadcast the rule set to the plurality of parties; and
in response to receiving confirmation of the rule set from one or more of the plurality of parties, enable the rule set by creating a record for the confirmation and storing the record in a blockchain database; and
in response to verifying that requested operation is valid;
cause the operation to be performed;
create a record for the operation, the record being specific to the rule set; and
store the record in the blockchain database, wherein the stored record enables the object to be traced.

14. The computer program product of claim 13, wherein the instructions, when executed on the device, further cause the device to set the rule set for the plurality of parties by:
receiving, from a party among the plurality of parties, a request for tracing the object;
in response to receiving the request for tracing the object, retrieving one or more records for operations related to the object from the blockchain data base; and
providing the retrieved records to the party.

15. The computer program product of claim 14, wherein the request for tracing the object comprises an event ID, the event ID being used to retrieve the object from the blockchain database.

16. The computer program product of claim 13, wherein the verifying the requested operation comprises:
extracting, from the request, a reference to the rule set; and
addressing the rule set based on the reference for the verifying.

17. The computer program product of claim 16, wherein the reference is implemented as a pointer or a uniform resource indicator (URI).

18. The computer program product of claim 13, wherein the rule set includes executable code, and wherein the verifying the requested operation comprises:
verifying the requested operation by causing the code to be executed.

19. The computer program product of claim 13, wherein the record further includes at least one of the following:
an event identification (ID) specific to the rule set,
a reference to the rule set,
an ID for the operation,
a description of the operation,
a signature of the first party,
a public key for decrypting the signature of the first party, and
a timestamp indicating a time point when the request is sent.

20. The computer program product of claim 13, wherein the instructions, when executed on the device, further cause the device to:
receive an inquiry fora state of the operation, the state indicating whether the operation is performed successfully;
in response to the inquiry, determine the number of subsequent records appended to the record for the operation in the blockchain database; and
determine the state of the operation based on the number of subsequent records.

* * * * *